(12) United States Patent
Sumida et al.

(10) Patent No.: US 7,535,947 B2
(45) Date of Patent: May 19, 2009

(54) ENHANCED BEAM QUALITY FROM A LASER ROD USING INTERSTITIAL DOPANTS

(75) Inventors: David S. Sumida, Los Angeles, CA (US); Kevin W. Kirby, Calabasas Hills, CA (US)

(73) Assignee: Raytheon Company, Waltham, MA (US)

( * ) Notice: Subject to any disclaimer, the term of this patent is extended or adjusted under 35 U.S.C. 154(b) by 167 days.

(21) Appl. No.: 11/584,691

(22) Filed: Oct. 20, 2006

(65) Prior Publication Data

US 2008/0165816 A1    Jul. 10, 2008

(51) Int. Cl.
*H01S 3/14* (2006.01)
(52) U.S. Cl. ............................................. 372/68; 372/6
(58) Field of Classification Search .................... 372/10, 372/40, 107; 359/265; 385/24, 92
See application file for complete search history.

(56) References Cited

U.S. PATENT DOCUMENTS 4,833,333 A * 5/1989 Rand ........................ 250/492.3
6,094,292 A * 7/2000 Goldner et al. ............. 359/265
6,996,137 B2 * 2/2006 Byren et al. ................... 372/10
2007/0242714 A1 * 10/2007 Sumida et al. ................ 372/40

FOREIGN PATENT DOCUMENTS

| WO | WO 03/088432 A | 10/2003 |
|----|----|----|
| WO | WO 2004/085719 A | 10/2004 |
| WO | WO 2007/120432 A | 10/2007 |

OTHER PUBLICATIONS

Flores-Romero, et al, "Planar waveguide lasers by proton implantation in Nd:YAG crystals", Optics Express, vol. 12, No. 10, pp. 2264-2269 (May 17, 2004).

* cited by examiner

*Primary Examiner*—Minsun Harvey
*Assistant Examiner*—Tuan N. Nguyen
(74) *Attorney, Agent, or Firm*—Leonard A. Alkov

(57) ABSTRACT

A laser rod is provided having a tailored gain profile such that the quality of the output beam is enhanced. The laser rod has a concentration of dopant ions having a first valence that is relatively high at the center of the rod and decreases to the surface of the rod. The laser rod further has a concentration of interstitial ions and dopant ions having a second valence that is lower than the first valence, the concentration being relatively high at the surface of the rod and decreasing to the center of the rod. Methods are provided for creating a layer of inactive laser species in the near surface region of a laser rod using interstitial dopant ions and for reducing the near surface absorption of incident photons intended to induce lasing in a laser rod using a layer of inactive laser ions.

8 Claims, 2 Drawing Sheets

ENHANCED BEAM QUALITY FROM A LASER ROD USING INTERSTITIAL DOPANTS

CROSS-REFERENCE TO RELATED APPLICATION

The present application is related to application Ser. No. 11/584,695, filed concurrently herewith and entitled "Reverse Oxidation Post-Growth Process for Tailored Gain Profile in Solid-State Devices" [PD-06WO17]. That application is directed to a substitutional process for ion exchange to tailor the profile of the laser rod.

TECHNICAL FIELD

The present invention is directed to the improvement of beam quality of a laser resonator, and, more specifically, to modifying the radial gain profile within a laser rod used in such laser resonator.

BACKGROUND ART

In order to control the mode quality of the output beam from a laser resonator, it is a common technique to take laser rods having a uniform concentration as received from the supplier and use additional optical components within the laser resonator. Such additional components may include hard or apodizing apertures. The disadvantage of such an approach is the necessity of using these additional optical components, which adds complexity, cost, and additional optical surfaces susceptible to optical damage.

A recent patent by Robert W. Bryen and David S. Sumida entitled "Solid State Devices with Radial Dopant Valence Profile", (U.S. Pat. No. 6,996,137, issued Feb. 7, 2006) suggests that the concentration of active laser ions in the near surface region may be decreased by treating the laser rods in a reducing environment at high temperature. The associated mechanism with this treatment is the removal of oxygen ions from the structure that results in a valence reduction of active laser ions in the same region. The valence reduction changes the active ions to an inactive state with respect to the desired optical absorption required for lasing. While this approach has proven to be valid, the process relies on the diffusion of oxygen vacancies into the host structure to create a layer of decreased active ion concentration. Due to the slow diffusion rate of the vacancies, the process affects only a very small near surface region of the laser rod. Calculations show that at temperatures near the melting point of the host, a time period of greater than 10 days is required to affect 50% of the active ions in a layer less than 0.1 mm in thickness from the surface. This process is therefore too slow to be effective for the desired change in the laser rod.

The use of interstitial ions to control the properties of a Nd:YAG laser substrate was disclosed by Flores-Romero et al, "Planar waveguide lasers by proton implantation in Nd:YAG crystals", Optics Express, Vol. 12, No. 10, pp. 2264-2269 (17 May 2004). The goal of their work, however, was to create a planar waveguide by changing the refractive index of the surface through proton ion implantation. Their work did not address reducing the concentration of active ions in the laser host.

DISCLOSURE OF INVENTION

In accordance with an embodiment of the present invention, a method is provided for creating a layer of inactive laser species in the near surface region of a laser rod using dopant ions. The method comprises:

providing an as-grown laser rod having active laser dopant ions of a first valence therein;

placing pre-selected chemical constituents into intimate contact with the surface of the laser rod; and diffusing the chemical constituents into the laser rod as interstitial ions that reduce the valence state of the active laser dopant ions to a second valence, thereby decreasing the concentration of the active laser dopant ions of a first valence at the near-surface periphery region and thereby forming a radial-dependent concentration profile of the first valence state dopant ions that is lower at the radial periphery as compared to the concentration of the first valence state dopant ions along the longitudinal axis.

In accordance with another embodiment of the present invention, a method is provided for reducing the near surface absorption of incident photons intended to induce lasing in a laser rod using a layer of inactive laser ions. The method comprises:

providing an as-grown laser rod having active laser dopant ions of a first valence therein;

placing pre-selected chemical constituents into intimate contact with the surface of the laser rod; and diffusing the chemical constituents into the laser rod as interstitial ions that reduce the valence state of the active laser dopant ions to a second valence, thereby decreasing the concentration of the active laser dopant ions of a first valence at the near-surface periphery region and thereby forming a radial-dependent concentration profile of the first valence state dopant ions that is lower at the radial periphery as compared to the concentration of the first valence state dopant ions along the longitudinal axis, wherein a radial-dependent gain profile within the rod is formed.

In accordance with yet another embodiment of the present invention, a laser rod is provided having a tailored gain profile such that the quality of the output beam is enhanced. The laser rod has a concentration of dopant ions having a first valence that is relatively high at the center of the rod and decreases to the surface of the rod. The laser rod further has a concentration of interstitial ions and dopant ions having a second valence that is lower than the first valence, the concentration being relatively high at the surface of the rod and decreasing to the center of the rod.

BEST MODES FOR CARRYING OUT THE INVENTION

Figure 1:
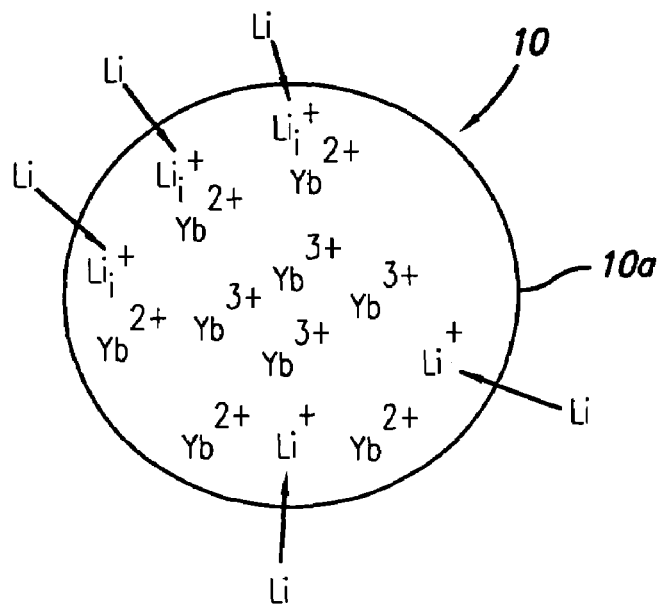
FIG. 1 is a schematic depiction of interstitial $Li^+$ diffusion into the Yb:YAG laser rod structure with a resulting valence change of $Yb^{3+}$ to $Yb^{2+}$ in the near surface region in accordance with an embodiment of the invention.

The key novel aspect of this invention is the concept of placing certain chemical element(s) into intimate contact with the surface of a laser rod for the purpose described below. Using a specific heat treatment, these elements diffuse into the laser element as interstitial ions. As these new ions migrate into the lattice, they reduce the concentration of "active" laser ions, beginning at the near-surface periphery region. In so doing, a tailored concentration profile of laser active ions is created in the laser element through this novel post-growth process. As a consequence of this concentration profile, the pump absorption and gain profiles become peaked along the rod longitudinal axis. Therefore, the rod acts as "soft" apodizing aperture in a laser resonator, and serves to discriminate against higher order resonator modes. Hence, the output beam quality improves and the elimination of higher modes (with associated higher peak intensities) also prevents optical damage within the laser resonator.

In the present invention, the rod serves a dual function of active gain medium as well as the apodizing aperture.

The teachings of the present invention are directed to modifying the radial gain profile within a laser rod so as to improve the beam quality of a laser resonator when such a modified rod is inserted therein. More specifically, the present invention teaches a method wherein the laser-ion profile is tailored in the transverse dimension of a laser rod (relative to its longitudinal axis) so that the active ion concentration is minimized at the radial periphery (i.e., the near surface region) as compared to the active ion concentration along the longitudinal axis (i.e., down the center of the rod). In so doing, the pump profile (and associated gain profile) varies radially from center to edge in accordance with the concentration profile. Such a radial-dependent gain profile within the rod serves as an apodizing "soft" aperture when placed within a laser resonator. Hence, the output beam quality from such a resonator will be improved as compared to an identical resonator under the same pumping conditions with a laser rod with uniform concentration (i.e., no radial dependence to the concentration). The teachings of the present invention apply to other laser medium geometries as well (e.g., slabs and disks).

Furthermore, an advantage of the present invention is the implementation of a process that is straight-forward, economically viable, and independent of specific laser-crystal suppliers. Specifically, the process of the invention is intrinsically achieved in the laser rod by a post-growth treatment, thus removing the laser rod supplier from the critical processing path. The present invention allows a conventional laser rod, commercially available to anyone, to be treated by an in-house process in order to achieve superior performance within a laser resonator. This capability clearly provides a competitive advantage to groups using the treated rods as opposed to those using the conventional laser rods.

The novel aspects of the present invention regarding the key fabrication and processing steps are described in more detail as follows. The processing sequence begins by placing certain chemical constituents into intimate contact with the surface of an as-grown laser rod. Using a prescribed heat treatment, these elements diffuse into the laser element as interstitial ions modifying the valence of the active laser ions that reside on those sites. As these new ions migrate into the lattice and modify the active ions, the concentration of active laser ions is decreased beginning at the near-surface periphery region. In so doing, a tailored concentration profile of active laser ions is created in the laser element through this novel post-growth process, wherein the concentration is now higher in the middle central region as compared to the outer peripheral zone.

An example of such a laser system is Yb:YAG. In this system, $Yb^{3+}$ ions, doped in the YAG host at the yttrium sites, are excited by the incident pump photons to induce lasing. Only Yb ions in the 3+ or trivalent state are laser active, i.e., exhibit appropriate absorption and emission cross sections consistent with laser operation. On the other hand, when Yb ions are in the 2+state, the associated absorption and emission cross-sections change dramatically, and the divalent Yb ions are no longer laser active. The teachings of the present invention are directed to providing a means for converting a significant fraction of the $Yb^{3+}$ ions (in the near surface region of the laser rod) into $Yb^{2+}$ to effectively decrease the local absorption of incident pump photons, and therefore reduce the gain as well. This in situ apodizing aperture allows for higher beam quality of the output beam.

In the case of Yb:YAG, the conversion of $Yb^{3+}$ to $Yb^{2+}$ is accomplished by diffusing ions with a valence or charge of either 1+, 2+, 3+, or 4+ interstitially into the laser rod. The presence of these diffused ions causes a charge compensation effect where the $Yb^{3+}$ ions are forced to convert to the 2+ state in order to satisfy charge neutrality for the sample. In the case of valences of 2+, 3+, or 4+, more electrons per interstitial dopant ion are released, but the end result (converting $Yb^{3+}$ to the $Yb^{2+}$ state) is the same. The advantage of employing ions with a lower valence, e.g., 1+, is that the charge compensation process occurs faster than with higher valence ions.

Since diffusion rates are typically higher for small, monovalent species (1+), a preferred ion for creating the desired conversion of the $Yb^{3+}$ to $Yb^{2+}$ would include, but not be limited to, $Li^+$. The method of incorporating $Li^+$ into the Yb:YAG consists of allowing lithium metal to be in contact with the laser rod surface in either solid, liquid, or vapor form, and allowing lithium to diffuse into the structure interstitially. The reaction for the incorporation of $Li^+$ and the $Yb^{3+}$ conversion is shown below, where

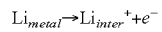

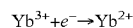

The reaction includes the dissociation of lithium metal into $Li^+$ and an electron ($e^-$). The electron is then trapped by the only species in the material capable of accepting the electron and changing valence, i.e., $Yb^{3+}$. Upon accepting the electron, the $Yb^{3+}$ is changed to the lower valence species, $Yb^{2+}$.

Lithium is known to diffuse interstitially as $Li^+$ in many oxide materials. The final diffusion profile for $Li^+$ and $Yb^{2+}$ in the YAG laser rod will depend on the concentration of lithium metal on the surface, the temperature, the soak time at temperature, and the diffusion coefficient for $Li^+$ in the Yb:YAG structure. Since $Li^+$ is a relatively small ion with only a single (+) charge, the diffusion coefficient should be relatively high in YAG.

FIG. 1 shows the process schematically for introducing Li interstitially into the Yb:YAG structure 10. In the Figure, only the affected cation species are represented, with the other structural species such as oxygen, aluminum, and yttrium omitted. As seen in FIG. 1, lithium metal in either a solid, liquid, or vapor form is incident on the surface 10a of the Yb:YAG laser rod 10. Lithium diffuses interstitially into the structure as $Li^+$, residing in close proximity to a neighboring Yb ion. Due to the charge compensation, the Yb ion changes valence from 3+ to 2+, creating a paired site with both ions summing to the total charge of 3+.

Figure 2:
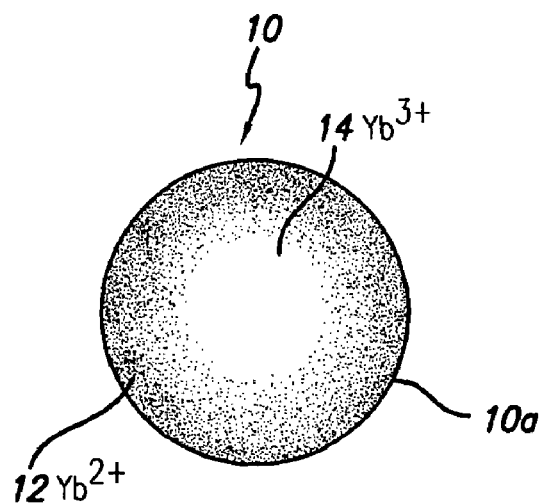
FIG. 2 is an end view of a laser rod processed in accordance with an embodiment of the invention.

FIG. 2 is an end view of a laser rod 10 processed in accordance with the teachings herein. The $Yb^{2+}$/Li+ ions reside in a layer 12 near the surface, while the $Yb^{3+}$ ions reside in the center region 14 of the rod.

Figure 2A:
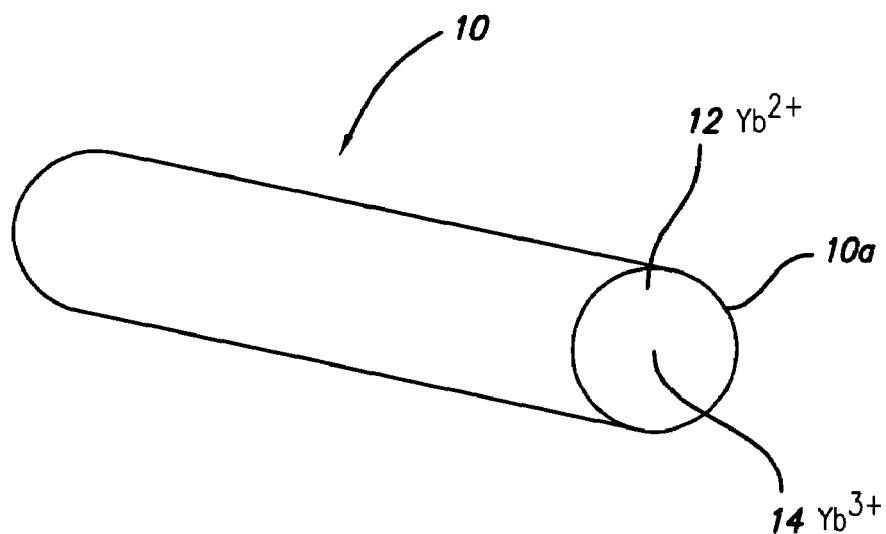
FIG. 2a is a perspective view of the laser rod of FIG. 2.

FIG. 2a is a perspective view of the laser rod.

Figure 2B:
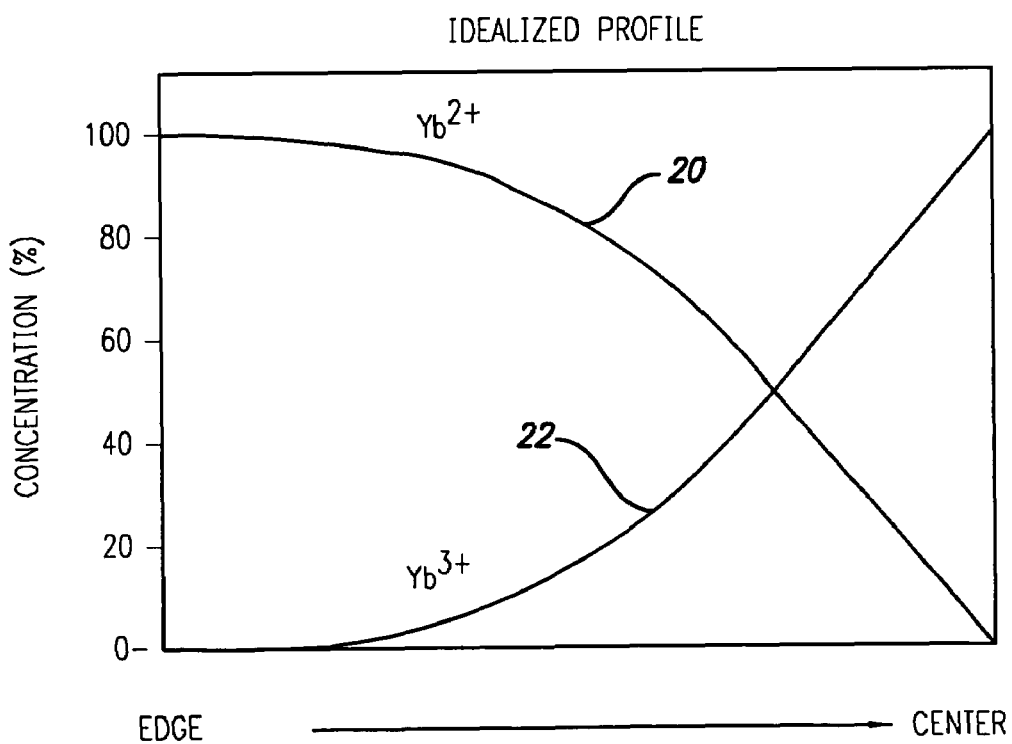
FIG. 2b, on coordinates of relative concentration and relative distance from center, is a plot of the idealized concentration profiles of $Yb^{2+}$ and $Yb^{3+}$ along the cross-section of the laser rod.

FIG. 2b shows the idealized relative profiles for $Yb^{2+}$ (Curve 20) and $Yb^{3+}$ (Curve 22), from the edge of the rod 10 to the center. It is seen that the $Yb^{2+}$ concentration is highest near the surface but drops off towards the center of the rod, while the opposite trend is true for $Yb^{3+}$.

While the foregoing discussion is provided in terms of YAG, employing $Yb^{3+}$ as the lasing dopant species, it will be appreciated by those skilled in this art that other lanthanide aluminum garnet laser rods, doped with other dopant species may be employed as the as-grown reduced-valence-state laser rod. Examples of such laser rods, in addition to yttrium aluminum garnet (YAG) described above, include, but are not limited to, lutecium aluminum garnet (LuAG), gadolinium aluminum garnet (GAG), gadolinium gallium garnet (GGG), and the like. Dopants for such laser rods, in addition to ytterbium (Yb) described above, include, but are not limited to, neodymium (Nd), erbium (Er), thulium (Tm), holmium (Ho), and the like.

The foregoing discussion is directed to Li as the source of the interstitial dopant species. Other interstitial dopant species may alternatively be used, so long as the species is small and is capable of rapid diffusion. Examples of such other interstitial dopant species include, in addition to lithium (Li) described above, but are not limited to, silver (Ag), aluminum (Al), beryllium (Be), and sodium (Na). The determination of such other substitutional dopant species is not considered to constitute undue experimentation, based on the foregoing considerations and the teachings herein.

What is claimed is:

1. A method for creating a layer of inactive laser species in the near surface region of a laser rod using dopant ions, the laser rod having longitudinal axis and a radial periphery about the longitudinal axis, the method comprising: providing an as-grown laser rod having active laser dopant ions of a first valence therein; placing pre-selected chemical constituents into intimate contact with the surface of the laser rod; and diffusing the chemical constituents into the laser rod as interstitial ions that reduce the valence state of the active laser dopant ions to a second valence, thereby decreasing the concentration of the active laser dopant ions of a first valence at the near-surface periphery region and thereby forming a radial-dependent concentration profile of the first valence state dopant ions that is lower at the radial periphery as compared to the concentration of the first valence state dopant ions along the longitudinal axis; wherein the laser rod is yttrium aluminum garnet (YAG); wherein the dopant species having the first valence state is Yb3+; wherein the reducing interstitial ions are Li+.

2. The method of claim 1 wherein the Li.sup.+ ions are provided by contacting the surface of the laser rod with the pre-selected chemical constituents, selected from the group consisting of lithium metal in either a solid, liquid, or vapor state and allowing diffusion of lithium ions to take place.

3. The method of claim 2 wherein the diffusion takes place according to the following reaction sequence:

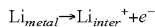

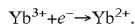

4. A method for reducing the near surface absorption of incident photons intended to induce lasing in a laser rod using a layer of inactive laser ions, the laser rod having longitudinal axis and a radial periphery about the longitudinal axis, the method comprising: providing an as-grown laser rod having dopant ions of a first valence therein; placing pre-selected chemical constituents into intimate contact with the surface of the laser rod; and diffusing the chemical constituents into the laser rod as interstitial ions that reduce the valence state of the active laser dopant ions to a second valence, thereby decreasing the concentration of the active laser dopant ions of a first valence at the near-surface periphery region and thereby forming a radial-dependent concentration profile of the first valence state dopant ions that is minimized at the radial periphery as compared to the concentration of the first valence state dopant ions along the longitudinal axis, wherein a radial-dependent gain profile within the rod is formed; wherein the laser rod is yttrium aluminum garnet (YAG); wherein the dopant species having the first valence state is Yb3+; wherein the reducing interstitial ions are Li.sup.+.

5. The method of claim 4 wherein the Li+ ions are provided by contacting the surface of the laser rod with the pre-selected chemical constituents, selected from the group consisting of lithium metal in either a solid, liquid, or vapor state and allowing diffusion of lithium ions to take place.

6. The method of claim 5 wherein the diffusion takes place according to the following reaction sequence:

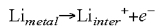

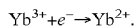

7. A laser rod having a tailored gain profile such that the quality of the output beam is enhanced, the laser rod having a concentration of dopant ions having a first valence that is relatively high at the center of the rod and decreases to the surface of the rod and having a concentration of interstitial ions and dopant ions having a second valence that is lower than the first valence, the concentration being relatively high at the surface of the rod and decreasing to the center of the rod; wherein the host laser rod is yttrium aluminum garnet (YAG); wherein the dopant species having the first valence is Yb3+; wherein the interstitial species is Li+.

8. The laser rod of claim 7 wherein the dopant species having the second valence is Yb2+.

* * * * *